United States Patent Office 3,283,009
Patented Nov. 1, 1966

3,283,009
ALDEHYDE SYNTHESIS
Hugh J. Hagemeyer, Jr., and Max Statman, Longview, Tex., assignors to Eastman Kodak Company, Rochester, N.Y., a corporation of New Jersey
No Drawing. Filed Mar. 29, 1962, Ser. No. 183,398
1 Claim. (Cl. 260—604)

This invention relates to the manufacture of $\alpha,\beta$-unsaturated aldehydes by catalytic oxidation of mono-olefins. Specifically, the invention relates to improvements in the process for vapor phase oxidation of mono-olefins and to novel catalyst compositions for such process.

Older methods for production of $\alpha,\beta$-unsaturated aldehydes by catalytic oxidation of olefins, for example, the oxidation of propylene to produce acrolein, have mainly used catalysts containing an oxide of copper on a suitable support. Silver and copper selenides and tellurium oxide have also been suggested. These processes, however, have been typified by low conversion and yield, and the products of such processes, e.g. acrolein, have remained expensive.

Recently, the patent to Idol, U.S. 2,904,580, described improved catalysts comprising bismuth, tin, and antimony salts of phosphomolybdic and molybdic acids, on suitable supports. The use of catalysts of this type, specifically bismuth salts of molybdic and phosphomolybdic acids, for vapor phase oxidation of propylene to acrolein was disclosed by Callahan et al. in U.S. Patent No. 2,941,007.

We have now discovered that in the process for vapor phase oxidation of mono-olefins to $\alpha,\beta$-unsaturated aldehydes in the presence of a salt of an acid selected from the group consisting of molybdic acid and heteropoly acids in which molybdenum is the co-ordinating atom (hetero-atom), a significant improvement is effected by presence of bromide ion, even in very small concentration, in the reaction zone. A bromide compound may be introduced in the reaction zone either as a component of the feed or as a previously incorporated component of the catalyst. Introduction of the bromide ion into the reaction zone causes significant improvement in conversion and yield of the desired $\alpha,\beta$-unsaturated aldehyde and causes significant reduction of undesirable side reactions.

The process of the invention in general comprises contacting in vapor state a lower aliphatic mono-olefin containing 3–10 carbon atoms with oxygen or an oxygen containing stream such as air at a temperature of 500–1000° F. in the presence of water and a catalyst of the type defined above and in the presence of bromide ion as a catalyst promoter.

The reaction occurring in the process is exemplified by the following equation:

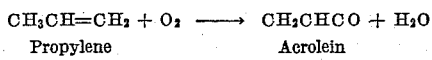

Propylene          Acrolein

Although we do not wish to be bound by theoretical explanation of the mechanism of the reaction it appears that in the synthesis of aldehydes from corresponding olefins the olefin is adsorbed by the solid catalyst in a manner analogous to that by which olefin hydration takes place and the dependent methyl group is then oxidized to a carbonyl group.

The process of the invention applies broadly to the oxidation of olefins, but it is particularly suited for oxidation of a lower molecular weight mono-olefin containing 3–10 carbon atoms, to produce the corresponding $\alpha,\beta$-unsaturated aldehyde, for example, acrolein from propylene, $\alpha$-methacrolein from isobutylene and $\alpha$-ethacrolein from 2-methyl-1 butene.

Catalysts suitable for use in the process of the present invention include the bismuth salts of molybdic and phosphomolybdic acids, such as those described in the Callahan et al patent mentioned above. Catalysts suittable for the process of the invention include other salts of molybdic acid and polyacids in which molybdenum is the co-ordinating atom, for instance, those catalysts described in the Idol patent mentioned above.

For optimum results, the selected catalytic salt is suspended on a suitable support which comprises about 50–70% by weight of the final catalyst composition. Particularly useful as catalyst supports are diatomaceous earths such as Celatom, as well as alumina, silica-alumina, and inert refractory-type oxides such as titanium dioxide and zirconium dioxide.

Catalyst materials specifically suited for some embodiments of this invention comprise a bromide compound dispersed in small amounts on the catalyst support with the catalyst of the type described. Ammonium bromide is one suitable bromide compound for this use.

The optimum mole ratio of oxygen to olefin in the feed stream is within the range from 0.5:1 to 10:1, usually a lower value in that range. Air is suitable as an oxygen source in the feed.

The optimum reaction temperature will usually be between 600° and 800° F., most often between 700 and 750° C. Optimum contact time, the rate of feed of reactants in cubic ft. per second divided by the catalyst volume in cubic feet, will usually be between 0.01 and 5.0 seconds.

The presence of water in the reaction zone is necessary to the reaction. Without water the carbonyl compound is not formed and only products of combustion are obtained. It is believed that water serves to inhibit excessive oxidation of the olefin. In the feed stock the water to olefin ratio is preferably in the range from 1:1 to 20:1. However, we have found that a 20:1 mole ratio of water to olefin in the feed stream will not produce significantly better results than does a mole ratio of 8:1.

An essential feature of the present invention is presence in the reaction zone of a bromide compound that yields a bromide ion. The bromide compound may be introduced with water in the feed stream or may be suspended on the catalyst support in the reaction zone. Other halide ions, chloride, fluoride, and iodide, do not produce any appreciable improvement in the reaction. Hydrogen bromide is the preferred bromide compound to be introduced in the feed stream, because it is most easily volatilized under reaction conditions. While we prefer ammonium bromide as the bromide component of the catalyst composition, other water soluble bromide salts, for example the alkali metal and alkaline earth metal bromides, may be used as the bromide component incorporated in the catalyst.

Only a very minor concentration of the bromide ion is necessary to produce significant improvements in conversion and yield. Hydrogen bromide present in concentrations as low as 0.001% in water fed with the reactants will produce appreciable improvement of conversion and yield of the unsaturated carbonyl compound and will suppress undesired side reactions. Also, improvement can be obtained by using a suitable solid catalyst impregnated with as little as 0.01% by weight of ammonium bromide.

Presence of the bromide promoter in small concentration in the reaction zone does not appreciably change the optimum operating conditions for the reaction. For example, in the oxidation of propylene to acrolein using bismuth molybdate and bismuth phosphomolybdate catalysts, the ranges of operating conditions were found to be essentially the same as those described in the Callahan et al. patent mentioned above, in which a bromide catalyst promoter was not used.

Following are examples illustrating certain features of the invention.

EXAMPLE 1

A solid catalyst was prepared as follows: 234 g. of bismuth nitrate pentahydrate was dissolved in 300 cc. of 10% nitric acid. To this was added 88 g. of phospho-12-molybdic acid. This gave an approximate mole ratio of bismuth to phosphomolybdic acid of 12:1. 480 grams of 4–6 mesh calcined diatomaceous earth, (Celatom) was slurried in this solution and the slurry was evaporated to dryness. After drying, the catalyst was placed in a tube reactor and heated to 1000° F. for 16 hours in a current of air. At the end of this period, the catalyst bed was cooled to 752° F. and a mixture of air, propylene and water at a 3:1:14 mole ratio was fed into the reactor. A bromide compound was not used. At a contact time of 1.78 seconds, 14.2% of the propylene was converted to acrolein with an ultimate yield of 54.6.%

EXAMPLE 2

The process described in Example 1 was continued under the same conditions except with the addition of hydrogen bromide to the water feed. The concentration of hydrogen bromide in the water was maintained at 0.005%. The conversion per pass of propylene to acrolein rose to 18% with an ultimate yield of 78%.

EXAMPLE 3

A mixture of air, propylene and water at a mole ratio of 4.2:1:13 was fed to the reactor and catalyst of Example 1 at a temperature of 734° F. with a contact time of 1.94 seconds. The conversion to propylene was 9% with an ultimate yield of 22%. Thus, low yields and conversions were obtained using the high air to propylene ratio. Use of a high water to propylene ratio did not produce complete control of the reaction.

EXAMPLE 4

Under the same operating conditions as in Example 3, hydrogen bromide was added with water in the feed at a concentration of 0.01% based on the water in the feed. This produced a conversion of propylene to acrolein of 16% with an ultimate yield of 38.6%.

EXAMPLE 5

Air and propylene were fed in a ratio of 5:1 without water to the reactor containing the catalyst of Example 1. The temperature was held at 734° F. with a contact time of 2.66 seconds. Without water there was no acrolein formed.

EXAMPLE 6

A catalyst was prepared as follows: 234 g. of bismuth nitrate pentahydrate was dissolved in 300 cc. of 10% nitric acid. To this was added 88 g. of phospho-12-molybdic acid. This gave an approximate mole ratio of bismuth to phosphomolybdic acid of 12:1. 480 grams of 4–6 mesh calcined diatomaceous earth (Celatom) was slurried in this solution and the slurry was evaporated to dryness. The solid residue was placed in an oven and heated to 1000° F. for 16 hours in the presence of air, then cooled to room temperature and impregnated with a solution containing 6 g. of ammonium bromide dissolved in 300 ml. of water. The impregnated material was dried, then loaded into a tube-type reactor and heated to 752° F. Then a mixture of air, propylene and water in a mole ratio of 2:1:10 was fed into the reactor. At a contact time of 3.2 seconds, 18% of the propylene fed was converted to acrolein with an ultimate yield of 80.1%.

EXAMPLE 7

Air, isobutylene and water were fed in a ratio of 2.2:1:10 to the reactor containing the catalyst of Example 6. At a temperature of 752° F. and a contact time of 2.8 seconds, conversion of isobutylene to methacrolein was 15% with an ultimate yield of 75%.

The above examples illustrate the improvement obtained with bromide compounds only with bismuth phosphomolybdate and only in the oxidation of propylene to its corresponding unsaturated aldehyde and only using hydrogen bromide and ammonium bromide as catalyst promoters. However, it is to be understood that in addition to these embodiments the invention further contemplates the use as catalysts of equivalent salts of molybdic acid and other heteropoly acids in which molybdenum is the coordinating atom of the acid radical. The invention also contemplates oxidation of other aliphatic mono-olefins containing 3 to 10 carbon atoms to the corresponding $\alpha,\beta$-unsaturated carbonyl compounds containing the same number of carbon atoms by the process of the invention. Furthermore, the invention contemplates use of equivalent bromide compounds as catalyst promoters for the reaction.

It will be understood that modifications and variations may be made within the scope of the invention as described above and as defined in the following claim.

We claim:

In a process for making acrolein by contacting in a reaction zone in vapor phase propylene with oxygen in the presence of water and in the presence of bismuth phosphomolybdate the improvement which comprises introducing hydrogen bromide in minor concentration into the reaction zone and wherein the mole ratio of water to the olefin is in the range from 1:1 to 20:1.

References Cited by the Examiner

UNITED STATES PATENTS

| | | | |
|---|---|---|---|
| 2,643,269 | 6/1953 | Augustine | 260—586 |
| 2,820,059 | 1/1958 | Hasek et al. | 260—604 |
| 2,821,559 | 1/1958 | Habeshaw et al. | 260—604 |
| 2,833,816 | 5/1958 | Saffer et al. | 260—524 |
| 2,837,486 | 6/1958 | Osberg | 252—437 |
| 2,914,485 | 11/1959 | Keith | 252—441 |
| 2,941,007 | 6/1960 | Callahan et al. | 260—604 |
| 3,177,257 | 4/1965 | Detling et al. | 260—604 |

LEON ZITVER, *Primary Examiner.*

M. A. BRINDISI, *Examiner.*

E. STERN, J. J. SETELIK, R. H. LILES,
*Assistant Examiners.*